March 22, 1932.　　M. B. GROUT　　1,850,102
WINDING MACHINE
Filed Aug. 24, 1927　　6 Sheets-Sheet 3
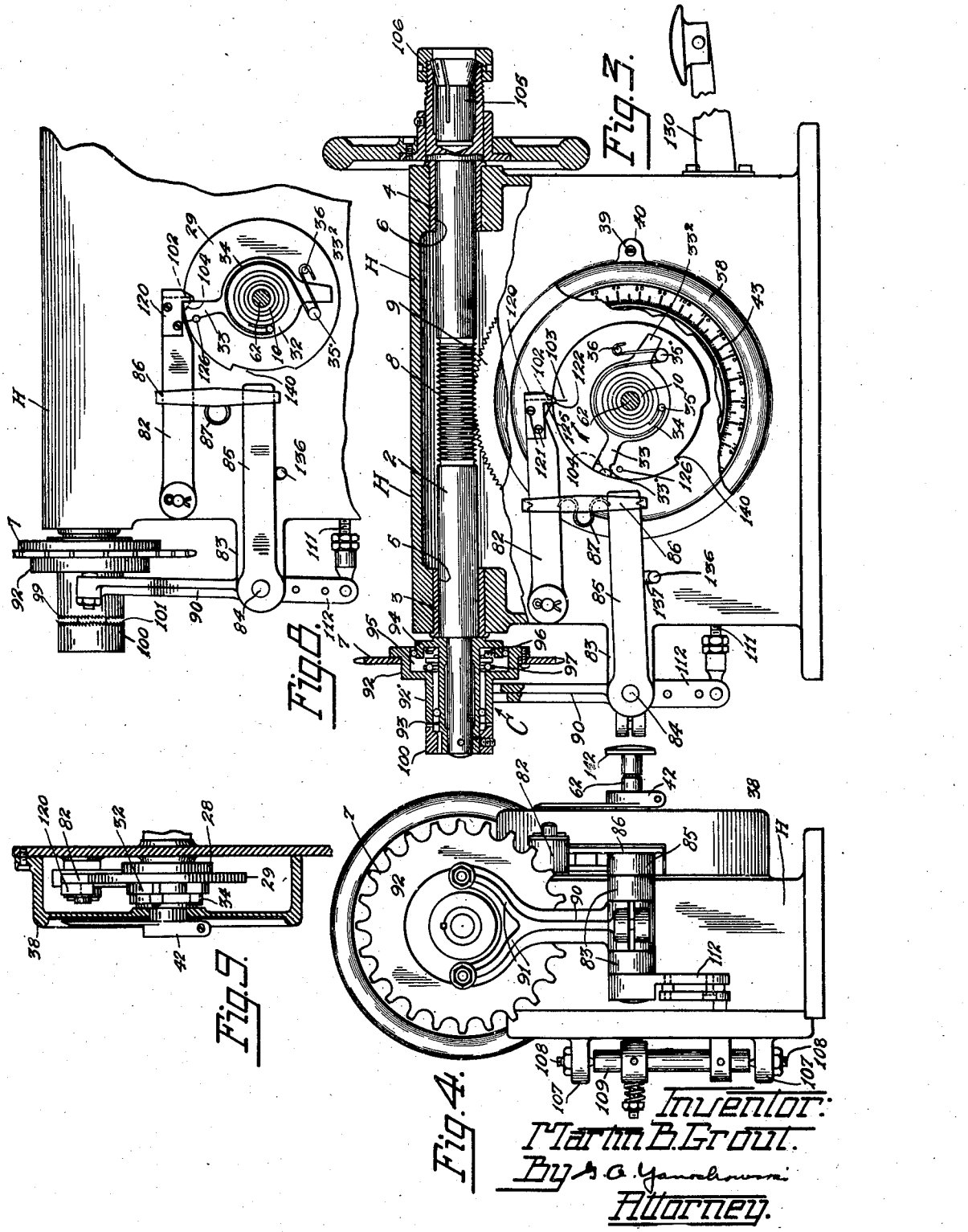

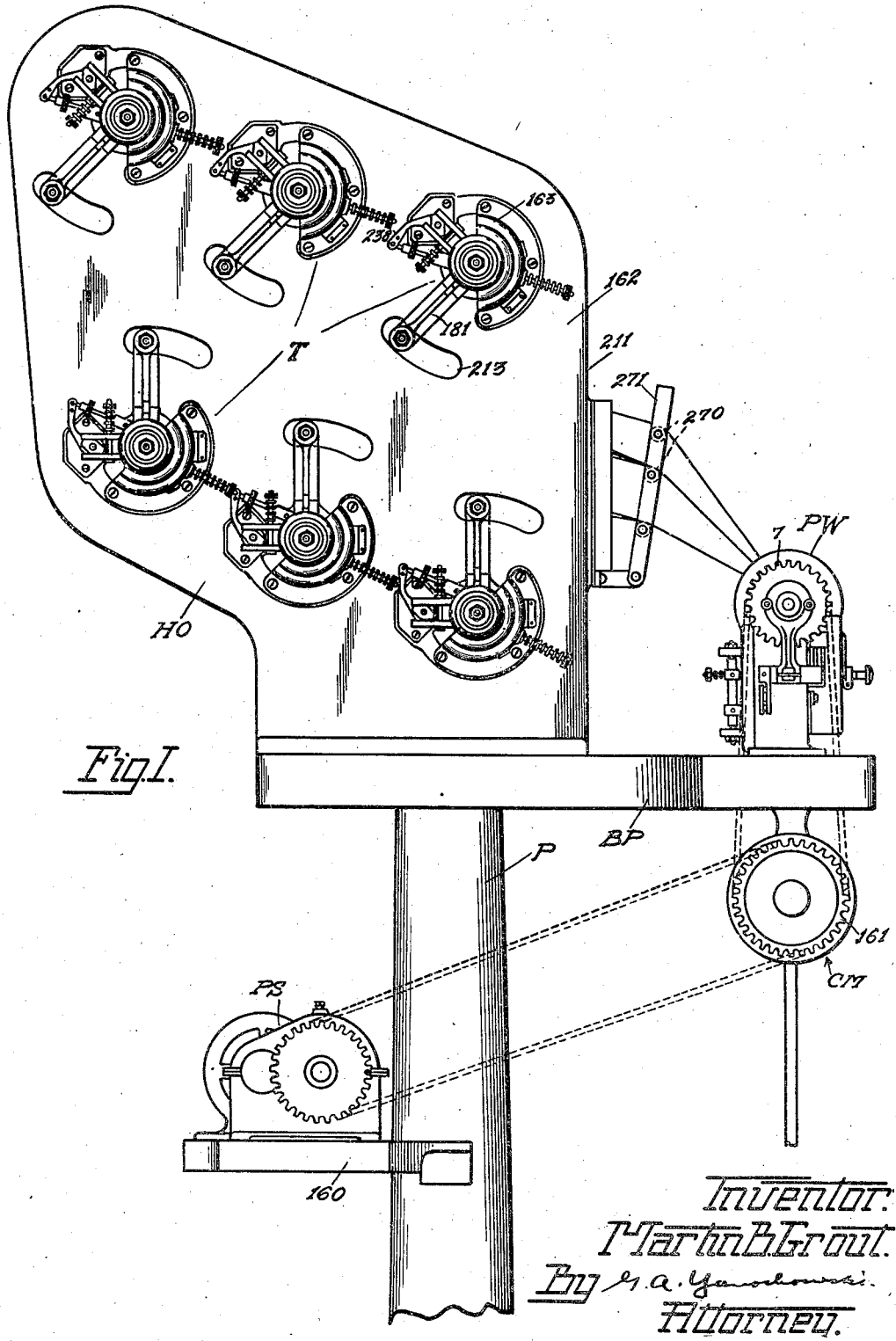

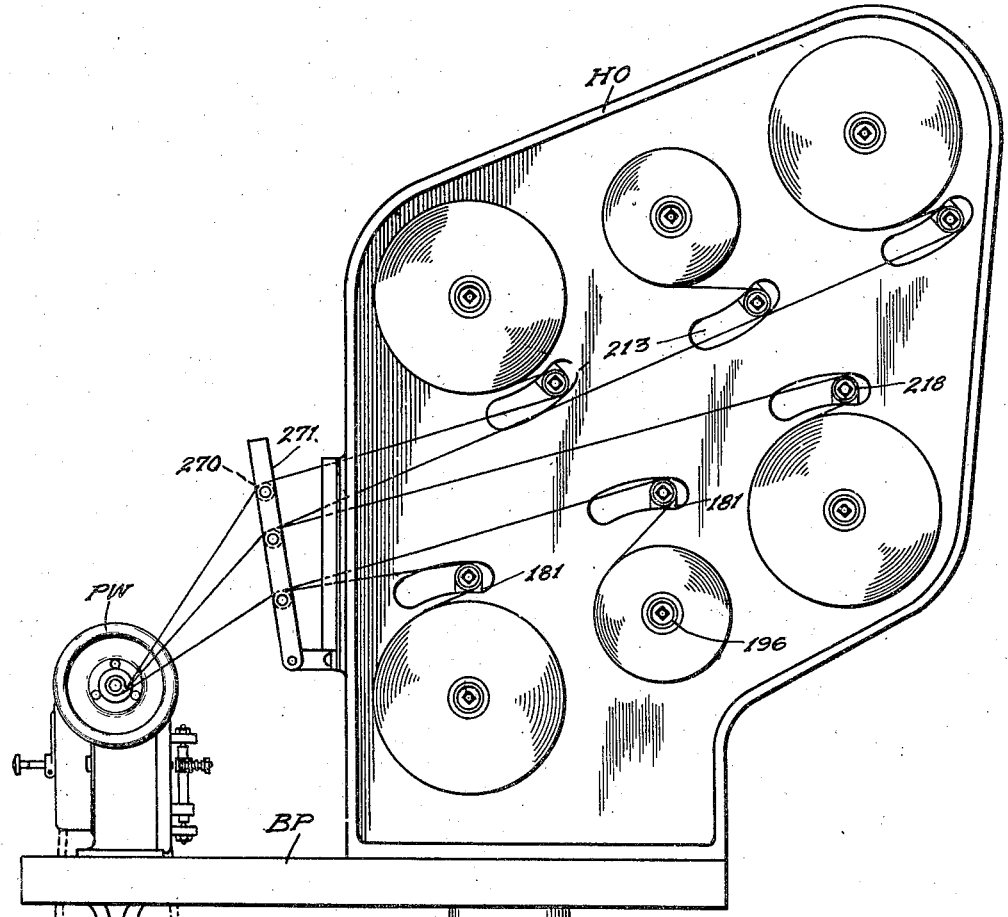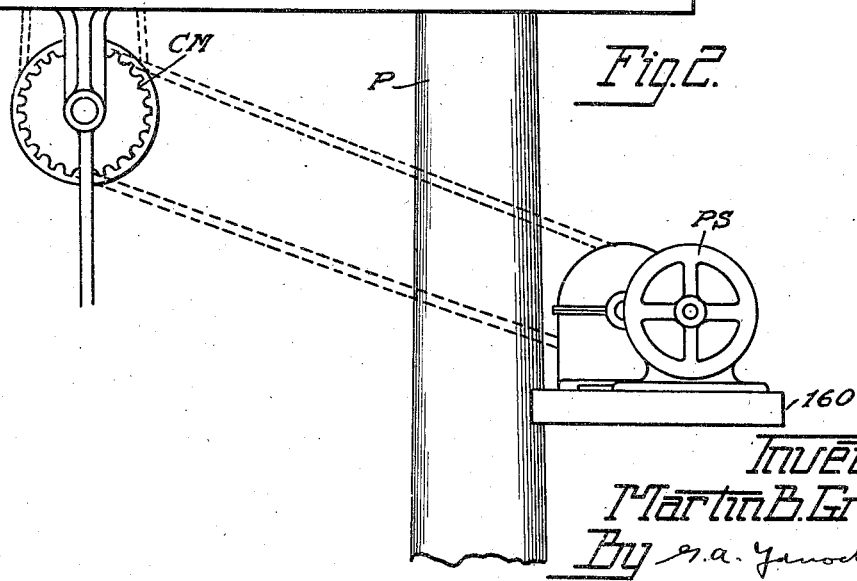

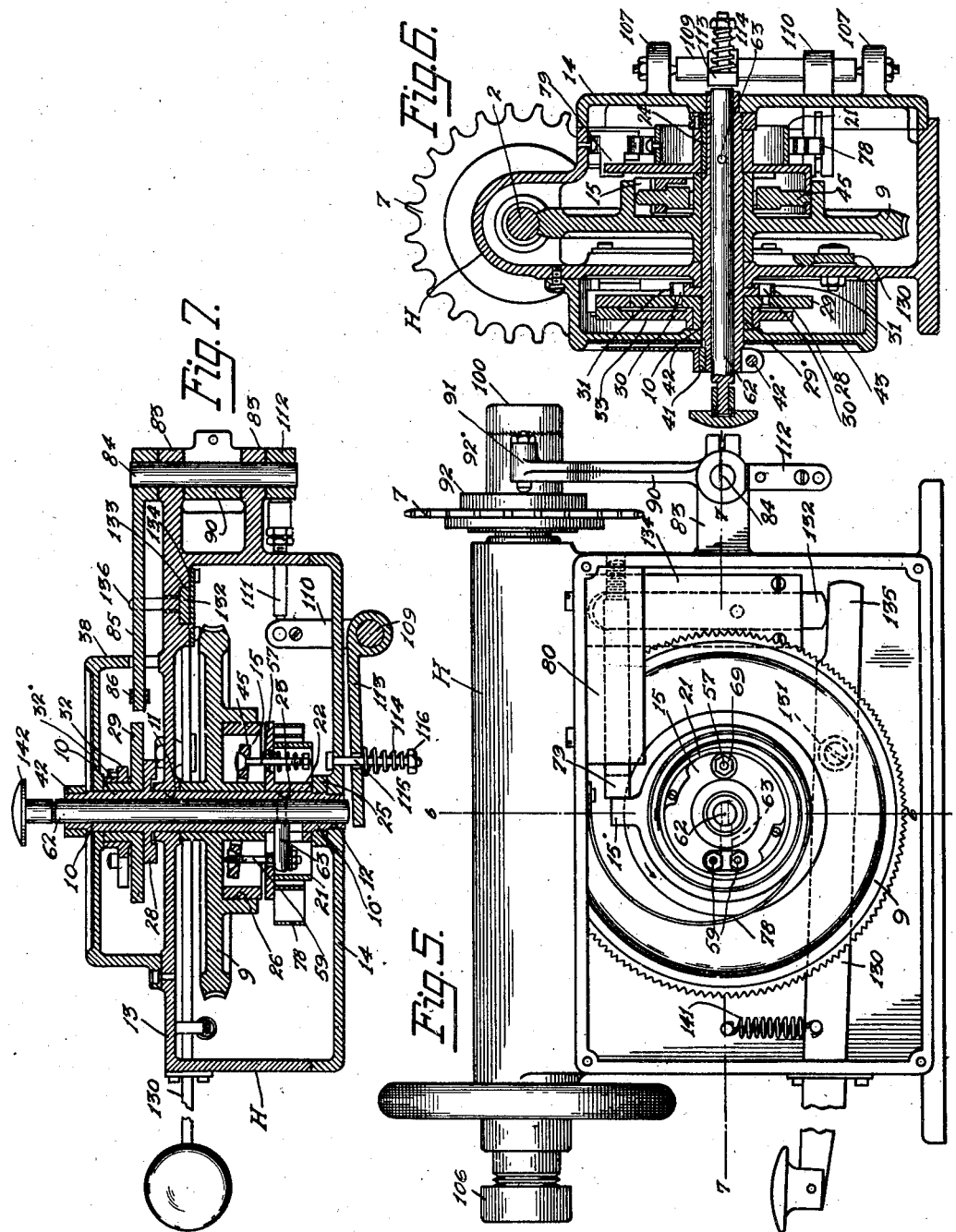

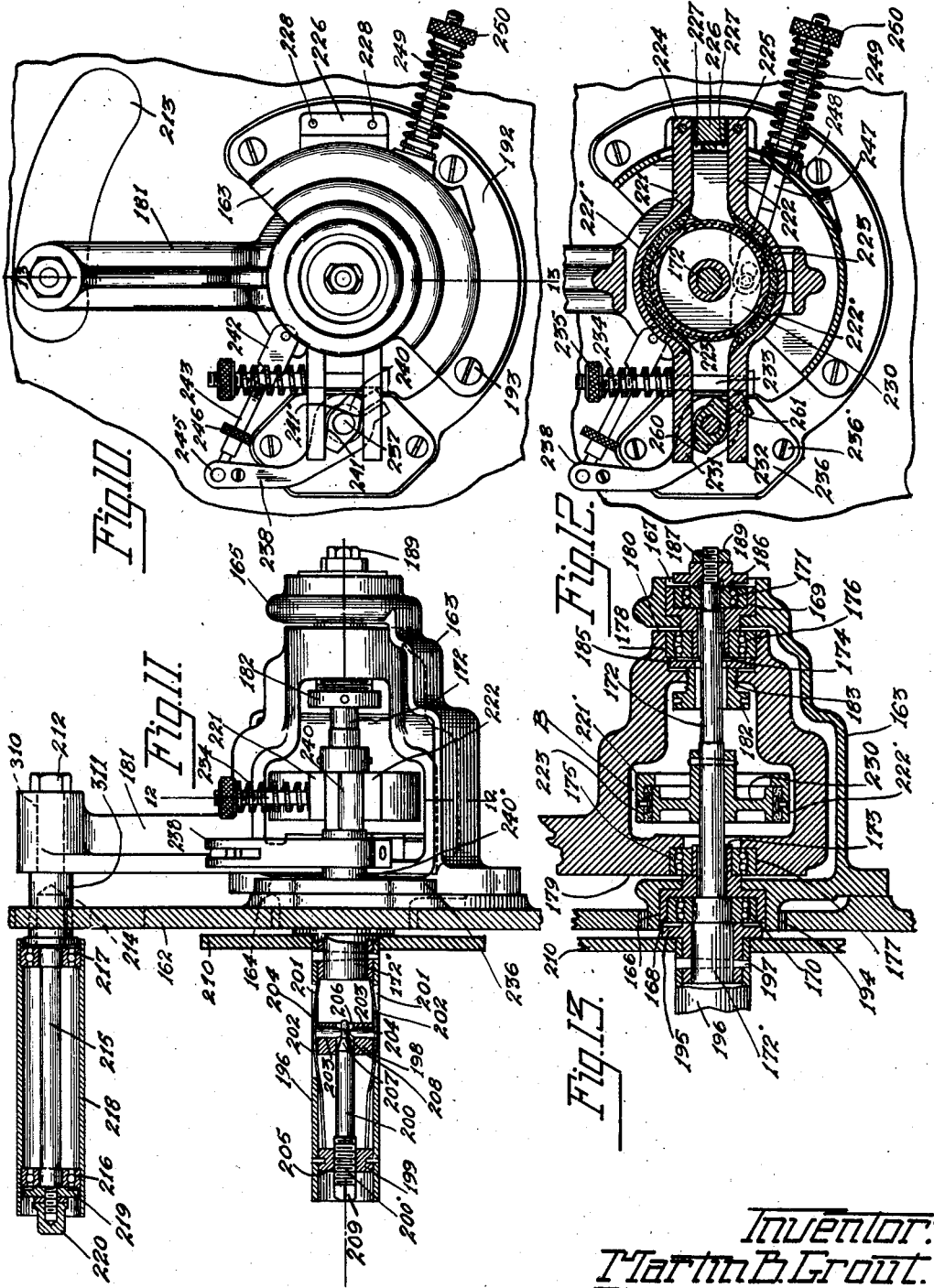

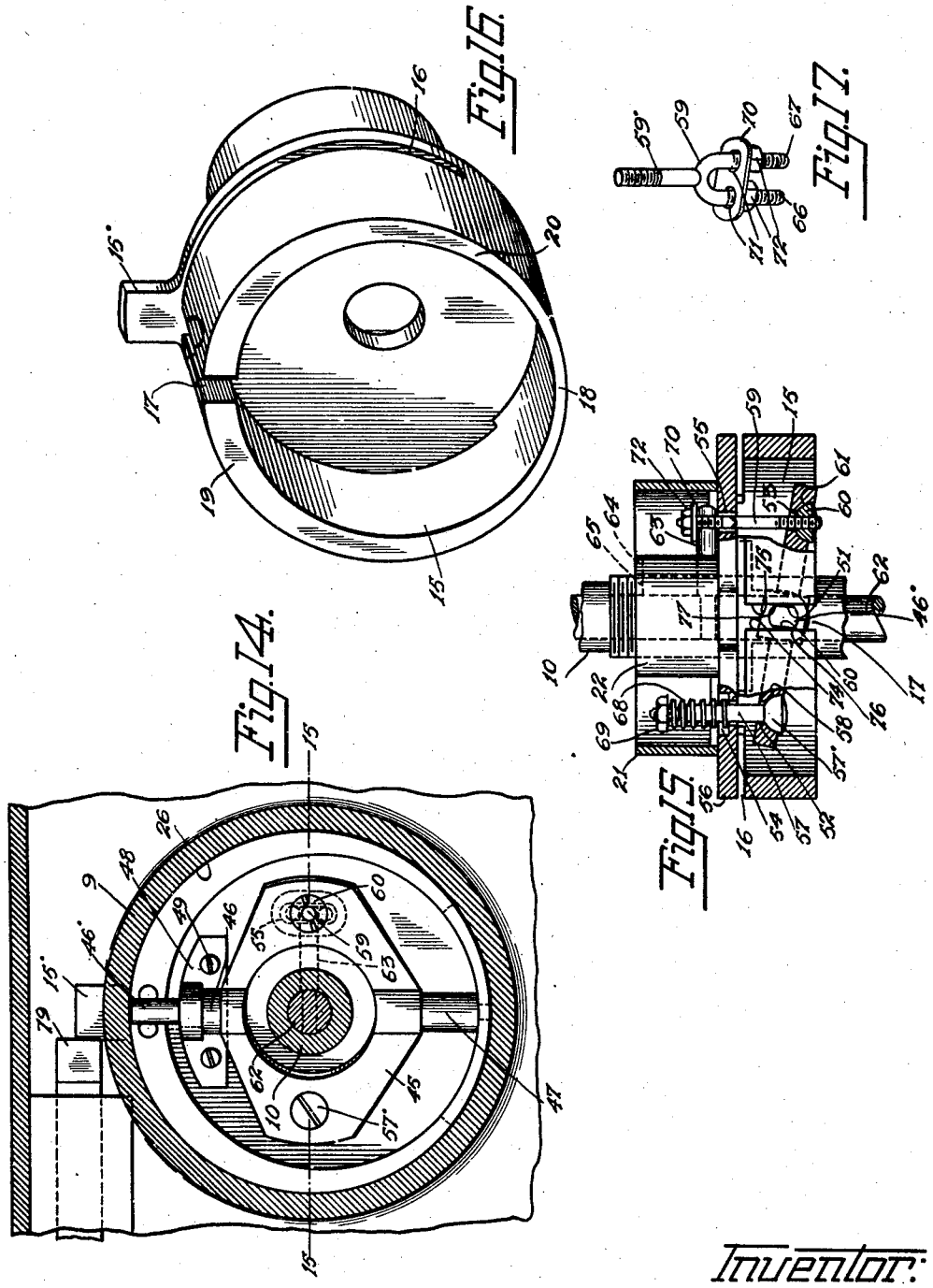

Patented Mar. 22, 1932

1,850,102

UNITED STATES PATENT OFFICE

MARTIN B. GROUT, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS

WINDING MACHINE

Application filed August 24, 1927. Serial No. 214,992.

My invention relates to winding machines and has more particularly to do with condenser winding machines in which suitable means are provided for winding the material consisting of foil or other material which form the plates and a suitable dielectric such as tissue paper into rolls to form condensers which are well known in the art. An object of my invention is the provision of a power winding machine of the above type which will efficiently wind condensers.

Condensers are wound to a predetermined capacity and it is therefore essential that the proper number of turns are placed on a suitable winding mandrel. After a predetermined number of turns have been placed on the winding mandrel the machine must be stopped to permit the insertion of the terminals for the plates of the condenser and then started again to place the remaining turns thereon for a given capacity. The winding of condensers at the present time is a manual operation in which the operator furnishes the power for rotating the winding spindle and in addition to this task watches the counter mechanism associated with the winding spindle to see that the proper number of turns are placed on the winding spindle. It is readily apparent that owing to error on the part of the operator the machine may be stopped before the required number of turns are placed on the winding spindle or more than the required number may be placed on this winding spindle before the machine is stopped.

To overcome this deficiency of manual winding of condensers I have devised a counter mechanism which in association with the winding spindle of the winding machine of my invention provides means whereby after a predetermined number of turns have been placed upon the winding spindle which is power driven, it is automatically stopped to permit the insertion of the terminals of the condenser.

Another feature of my invention is the provision of means which when actuated by the operator after the terminals have been inserted, automatically starts the rotation of the winding spindle to permit the remaining turns to be placed on the winding mandrel when the winding spindle is again automatically stopped.

Another feature of my invention is the provision of interchangeable means associated with the counting mechanism whereby any number of stops of the winding spindle may be accomplished and whereby any number of turns may be initially placed on the winding spindle before the same is automatically stopped and in which the means permit the winding spindle to again be started.

Another feature of my invention is the provision of clutch mechanism associated with the winding spindle which is operated to instantly disconnect the winding spindle from the power supply when the means associated with the counter mechanism functions after a predetermined number of turns have been placed upon the winding spindle.

Still another feature of my invention is the provision of combined material supporting spindle and tension devices which support the rolls of material which are wound upon the winding spindle of the winding machine of my invention.

Another feature of my invention is the provision of a tension arm in association with material supporting spindle which function to keep the material between the winding spindle and the tension arm roller over which the material passes taut and at the proper tension during the winding operation.

Another feature of my invention is the provision of novel brake means associated with the material supporting spindle which is under the control of the tension arm and which functions to stop rotation of the material supply spindle the instant that the tension on the material being delivered to the winding spindle ceases, to prevent any over-run of the material supported thereon.

Still another feature of my invention is the provision of adjustable means for regulating the tension of the tension arm of the combined material supporting spindle and tension device to permit the use of material of varying thickness, this, of course, depending upon the type of condenser being built.

Another feature of my invention is the provision of means which maintains the layers of foil and paper in alignment while being wound into a spool.

Another feature of my device is the provision of means for smoothing out the paper and foil as it is being wound, so that no wrinkles appear in the same after it is wound upon the mandrel.

By rotating the spindle at a constant speed I am able to form regular coils having uniform stress between the layers, and I am further enabled to greatly speed up the winding speed by means of my automatic stop mechanism. Further the coils wound are all of uniform capacity since the tension on the material wound is always the same and the number of turns wound is always the same.

The above features as well as others not specifically pointed out will be more fully described in the ensuing specification and appended claims.

For a more complete understanding of my invention references may be had to the accompanying drawings in which like reference characters in the several views denote like parts and in which Fig. 1 is a site elevation of the power condenser winding machine of my invention.

Fig. 2 is a reverse side elevation of Fig. 1 illustrating how the paper and foil rolls are supported on the material supporting spindles and the tension devices are associated with the same.

Fig. 3 is a front elevation of the power winder of my invention with parts broken away to clearly illustrate the winding spindle and other parts associated therewith.

Fig. 4 is a left end view Fig. 3.

Fig. 5 is a rear view of Fig. 3 with the rear cover of the enclosing casing removed to clearly illustrate the interior mechanism.

Fig. 6 is a sectional view of the power winder along the line 6—6 of Fig. 5.

Fig. 7 is a sectional view along the line 7—7 of Fig. 5.

Fig. 8 is a fragmentary view of the power winder illustrating the driving clutch in a disengaged position.

Fig. 9 is a fragmentary view partially in section to illustrate a portion of the counting mechanism.

Fig. 10 is a front elevation of one of the combined material supporting spindles and tension devices which supports a roll of paper or tin foil.

Fig. 11 is a left end view of Fig. 10.

Fig. 12 is a sectional view along the line 12—12 of Fig. 11 illustrating the tension device and the braking means associated with the material supporting spindle.

Fig. 13 is a sectional view along line 13—13 of Fig. 10.

Fig. 14 is a view of the counter device of my invention.

Fig. 15 is a sectional view along the line 15—15 of Fig. 14.

Fig. 16 is a perspective view of the gripping device which is associated with the driving means of the counting mechanism, and Fig. 17 is a perspective view of the yoke member associated with the gripping member of the counting mechanism.

Referring now in detail to my invention as illustrated in the accompanying drawings and particularly to the power winder PW, it comprises a suitable enclosing casing or housing H, which encloses the mechanism of the same. A pair of bearings 3 and 4 in the orifices 5 and 6 in the respective ends of the housing H rotatably support a spindle shaft 2. A sprocket 7 is slidably and loosely supported on one end of the spindle shaft 2 and transmits motion to the spindle shaft 2 through the medium of suitable clutch mechanism C as will be more fully hereinafter described. The spindle shaft 2 has a worm portion 8 cut thereon and meshes with a worm gear 9 loosely supported on a hollow transverse shaft 10 rotatably supported in bearings 11 and 12 respectively in the front wall 13 of the casing H and the rear removable cover 14. A cup shaped gripping member 15 is provided with a peripheral slot 16 extending through the wall of the member 15 and another slot 17 at right angles to the peripheral slot 16 is cut in the wall of the member to intersect the peripheral slot 16. The inside diameter of the cup shaped member 15 is eccentrically disposed relative to the outside diameter of the cup member 15, and the slot 17 in association with the peripheral slot 16, and the reduced wall portion 18 of the cup member 15, form a pair of expandible wings 19 and 20 for purposes as will presently be described.

The member 15 is provided with a rearwardly extending collar 21 secured thereto by suitable screws and an integrally formed rearwardly extending sleeve 22 provided with an orifice 23 of a size to permit the cup member 15 to be slipped on to the hollow shaft 10. The hollow shaft 10 and orifice 23 in the sleeve extension 22 are provided with key ways and a key 24 resting in the key ways secures the cup member 15 to the hollow shaft 10 so the same will rotate with the shaft 10 when it is rotated. The end 10' of the shaft 10 is threaded and a collar 25 having screw threaded engagement with the threaded portion 10' of the shaft 10 secures the cup member 15 on the shaft 10 against longitudinal movement. The worm gear 9 is provided with counterbore 26 of a size to receive the split or gripping portion of the cup member 15 and the depth of the counterbore 26 in the worm gear 9 is substantially the same as the split or gripping portion formed by the wings 19 and 20 which rest wholly within the counterbore 26. Suitable means associated with the cup member 15, and hereinafter more fully described, normally holds the wing members 19 and 20 in expanded position to cause the same to grip the counterbore 26 of the worm gear 9 to transmit rotation to the hollow shaft 10 as will presently be described.

The hollow shaft 10 extends forward through the front wall 13 of the housing H and this extended portion of the shaft 10 is provided with an annular flange 28 integrally formed therewith. A disk 29 having an integrally formed sleeve extension 29' is provided with an orifice of a size to permit the same to be slipped over the hollow shaft 10. The disk 29 has secured to its rear face a pair of rearwardly extending diametrically disposed pins 30 which are adapted to fit into a pair of aligned orifices 31 in the flange 28, integral with the shaft 10, so that when the shaft 10 rotates the disk 29 also rotates. A second disk member 32 having an integrally formed sleeve extension 32' is provided with an orifice of a size to permit the same to be slipped over the sleeve extension 29' of the disk 29 and an arm extension 33 integrally formed with the disk 32 is provided with an arcuate end 33' which coincides with the peripheral edge of the disk 29 and this arm 33 and disk 29 are operatively associated with each other for purposes to be presently described. A coil spring 34 having one end secured to a pin 35 secured to the disk 32 and its other end looped around a stop pin 35' secured to the disk 29 and secured to a pin 36, fastened to the disk 29, maintains the stop arm 33², integral with the disk 32, in engagement with the stop pin 35' for purposes as will presently be described. A cup shaped cover 38 provided with a central orifice through which the end of the hollow shaft 10 extends is secured to the casing by means of screws 39 which pass through orifices in tabs 40 integral with the cover 38 and have threaded engagement with tapped orifices in the housing H, and the cover 38 when in position as just described maintains the disks 29 and 32 on the hollow shaft 10 against longitudinal movement. An indicator arm 42 is secured to the end of the hollow shaft 10, which protrudes through the central orifice in the cover 38, by means of a key 41 which fits into a keyway in the shaft 10 and orifice in the indicator arm 42. The indicator arm is provided with a bifurcated depending portion and a screw 42' clamps the said arm 42 on the shaft 10 against movement. A graduated dial 43 is secured to the cover 38 and in association with the indicator arm 42 indicates the number of turns (of operation) of the spindle shaft for purposes as will presently be described.

The means associated with the gripping member 15 for maintaining wing members 19 and 20 of the same in their expanded position to engage the circumferential face of the counterbore in the worm gear 9 comprises a substantially hexagonal shaped plate 45 provided with a pair of extending members 46 and 47 in axial alignment. The end of the extended member 47 rests in an orifice in the wall 18 of the cup member 15 and the other extended member 46 is supported intermediate of its end in a bracket 48 secured to the base of the cup member 15 by means of screws 49 to pivotally support the plate in the cup member 15. The end 46' of the extended portion 46 of the plate 45 which protrudes through the bracket 48 extends into the slot 17 which is at right angles to the peripheral slot 16 in the cup member 15 and is shaped to form an operating or actuating head 46', and is provided with flat faces 50 and 51 for purposes as will presently be described. The plate 45 is provided with a pair of diametrically opposite orifices 52 and 53 which are in alignment with a pair of orifices 54 and 55 extending through the base 56 of the cup member 15. A screw 57 provided with a hemispherical head 57' rests in a concave countersunk portion 58 around the orifice 52 in the plate 45 and extends through the aligned orifices 52 and 54 in the plate 45 and the base 56 of the cup member 15. A forked shaped member 59 extends through the oblong orifice 55 in the base 56 of the cup member 15 and an upwardly extending threaded stud 59' integral with the forked member 59 extends into the aligned orifice 53 in the plate 45 and a hemispherical shaped nut 60 having threaded engagement with the stud 59' rests in a concave countersink 61 around the orifice 53. A trigger rod 62 which extends through the hollow shaft 10 and a pin 63 secured thereto intermediate of its ends extends through longitudinal slots 64 and 65 in the sleeve extension 22 of the cup member 15 and hollow shaft 10 and lies between the legs 66 and 67 of the forked shaped member 59 which protrudes through the orifice 55 of the base 56 of the cup member 15. The screw 57 extends through the orifice 54 in the base 56 of the cup member 15 and this protruding portion supports a coil spring 68 which rests between the base 56 of the cup member 15 and an adjusting nut 69 which has threaded engagement with the screw 57 and is used for placing the spring 68 under proper compression. The plate 45 pivotally supported in the cup member 15 is normally tilted from its horizontal plane as illustrated in Fig. 15, due to the compression of the spring 68. The forked member 59 between which the pin 63 secured to the trigger rod 62 is secured is linked with the plate 45 by means of a plate 70 provided with a pair of orifices 71 through which the legs 66 and 67 of the forked member 59 extend and nuts 72 having threaded engagement with the legs 66 and 67 position the plate 70 on the forked member 59 in engagement with the pin 63 for purposes as will presently be described.

As the plate 45 pivotally supported in the cup member 15 is normally tilted as just described the faces 50 and 51 of the actuating head 46′ integral with the plate 45 which rests in the slot 17 in the cup member 15 are angularly disposed relative to the faces 74 and 75 of the slot 17. The diametrically opposite edges 76 and 77 of the actuating head 46′ engage the respective faces 74 and 75 of the slot 17 and spring or spread the wings 19 and 20 of the split portion of the member 15 and as the split portion of the member 15 lies wholly within the counterbore 26 of the worm gear 9, the expansion of the wings 19 and 20 of the split portion of the member 15 causes the circumferential faces of the wings 19 and 20 to firmly grip the circumferential face of the counterbore 26 of the worm gear 9 loosely supported on the hollow shaft 10.

A spiral leaf spring 78 is provided and has one end secured to the housing H by suitable means and its other end secured to the sleeve extension 21 secured to the base 56 of the cup member 15. The tension of the spiral spring 78 is such as to maintain the tongue extension 15′ integral with the cup member 15 against an adjustable stop 79 supported in a block 80 secured to the housing H. The cup member 15 as before described is secured to the hollow shaft 10 and through the agency of the split portion which forms the wings 19 and 20 normally grips the circumferential face of the counterbore 26 in the worm gear 9. When the worm gear 9 which is loosely supported on the hollow shaft 10 is rotated due to its meshing with the worm 8 on the spindle shaft 2, rotation is also transmitted to the cup member 15 as the wings 19 and 20 normally grip the circumferential face of the counterbore 26 in the worm gear 9 causing the hollow shaft 10 to rotate. As the cup member 15 rotates its integrally formed tongue 15′ moves away from the stop 79 and this rotation of the cup member 15 places the spring 78 under tension so that when the trigger rod 62 is moved to bring about the collapsing of the wing members 19 and 20 to disengage the face of the counterbore 26 in the worm gear 9 the spring 78 will again return the cup member 15, hollow shaft 10 and its supported parts secured thereto back to their normal positions with the tongue extension 15′ of the cup member 15 again engaging the stop 79 all of which will be more fully hereinafter described.

The disk 29 which is connected to the hollow shaft 10 by means of the pins 30 secured thereto and which extend into the orifices 31 in the flange 28 integral with the hollow shaft 10 to cause the same to rotate therewith is operatively associated with a detent 82 pivotally secured to the front wall of the housing H to control the clutch mechanism C for connecting and disconnecting the spindle shaft 2 from the source of power for rotating the same. A pair of ears 83 integral with the housing H pivotally support a stub shaft 84 one end of which has secured thereto an arm 85 extending parallel with the detent 82 and which is pivotally secured to the housing H. A yoke member 86 straddling the detent 82 and arm 85 link them together and a leaf spring 87 resting between the bottom edge of the detent 82 and the top edge of the arm 85 maintains the detent 82 and arm 85 in spaced relation and in association with the yoke member 86, and any movement of the detent 82 will be transmitted to the arm 85. A clutch arm 90 is secured to the stub shaft between the extending ears 83 of the housing H and extends upward with its bifurcated end 91 engaging a slidable collar 92 of the clutch mechanism C.

The clutch mechanism C comprises a sleeve 93 secured to the spindle shaft which is provided with an integrally formed flange 94 which rests in the counterbore 95 of the collar 92 to which the sprocket wheel 7 is secured. A leaf spring 96 rests between the flange 94 of the sleeve 93 and a thrust bearing 97 loosely supported on the sleeve 93 and is contained within the counterbore 95 of the collar 92. The collar 92 is provided with a sleeve extension 92′, the end of which is provided with ratchet teeth 99. A collar 100 is keyed to the sleeve 93 and the end of which is provided with ratchet teeth 101. The tension of the leaf spring 96 supported between the flange 94 and the thrust bearing 97 is such as to force the collar 92, supporting the sprocket 7, to the left with reference to Fig. 3 to normally maintain the teeth 99 on the sleeve extension 92′ of the collar 92 in engagement with the ratchet teeth 101 on the collar 100, secured to the sleeve 93, to form a ratchet clutch to transmit movement to the spindle shaft 2.

As is well known in the art a condenser comprises plates of foil and a dielectric between the plates and comprises a predetermined number of turns for a given capacity. In the process of winding a condenser a terminal is inserted for each of the plates after a certain number of turns have been placed on the winding mandrel and thereafter the remaining turns or layers are placed thereon for the required capacity. In manual or hand winding of condensers the operator is required to watch a counting device which registers the number of turns for a given capacity as well as apply the necessary power for rotating the machine. The power winding machine which comprises a part of my invention is provided with automatic means for stopping the rotation of the spindle shaft, when a predetermined number of turns have been placed on the winding mandrel supported by the spindle shaft, to permit the insertion of the terminals and thereafter to again start the rotation of the winding spindle to place the remaining turns on the winding mandrel for a given capacity of condenser, at which time the winding spindle is stopped automatically as will presently be described.

The cup member 15 when in normal position has its tongue extension 15' engaging the stop 79 secured to the housing H and the hollow shaft 10 being secured thereto as before described the orifices 31 in the integrally formed flange 28 of the hollow shaft 10 are therefore positioned to place their centers in a vertical plane. The disk 29 which is supported on the shaft 10 and connected thereto by the pins 30, as before described, is engaged by the nose 102 of the detent 82 normally held against its peripheral edge by means to be presently described. The edge of the detent 82 and an indication mark 103 on the face of the disk 29 coincide and indicate the normal or zero position of the disk 29. The disk 29 is provided with a notch 104 in its peripheral edge which is spaced a predetermined distance from the zero or indication mark 103 into which the nose 102 of the detent 82 drops after a predetermined number of turns have been placed upon the winding mandrel to arrest the rotation of the winding spindle 2.

A split chuck 105 is associated with the winding spindle 2 and through the medium of a collar 106 having threaded engagement with the end of the winding spindle 2 engages the split chuck 105 to clamp a suitable winding mandrel (not shown) upon which the condenser is wound. The rolls of tin foil which form the plates and the dielectric are supported by the tension devices T secured to the housing HO which is supported on the pedestal P. The foil and dielectric are brought out through the opening in the housing HO and attached to the winding mandrel secured to the winding spindle 2 by the chuck 105. The detent 82 pivotally secured to the housing H is normally held in a raised position with its nose 102 engaging the peripheral edge of the disk 29 in position relative to the zero or indication mark 103 on the disk 29 as before noted. Due to the link connection 86 between the detent 82 and the arm 85 secured to the stub shaft 84 the said arm is also raised causing the stub shaft 84 to rotate in its bearing in the extended ears 83 of the housing H to tilt the clutch arm 90 to the left with reference to Fig. 3. The movement of the bifurcated end 91 to the left permits the leaf spring 96 associated with the clutch mechanism C, as before described, to slide the collar 92 to the left with reference to Fig. 3, placing the ratchet teeth 99 in the end face of the sleeve extension 92' of the collar 92 in mesh with the ratchet teeth 101 in the end face of the collar 100 secured to the sleeve 93, which is in turn secured to the winding spindle 2.

The removable cover 14 of the housing H is provided with a pair of integrally formed ears 107, and bearing screws 108 having threaded engagement with tapped orifices in the respective ears 107, pivotally support a rod 109 between them. An arm 110 secured to the rod 109 extends through a suitable orifice in the removable cover 14, and by means of a link connection 111, which extends through a suitable orifice in the end face of the housing H the depending arm 112 secured to the stub shaft 84 and arm 110 secured to rod 109 are linked together. The arm 112 secured to the stub shaft is moved to the right with reference to Fig. 3 when the detent 82 is in its raised position, thus moving the link connection 111 to the right causing the arm 110 secured to the pivoted rod 109 to move to the left with reference to Fig. 7. The movement of the arm 110 to the left causes pivoted rod 109 to be rotated about its pivot screws 108 to move an arm 113 secured to the rod 109 against the tension of a coil spring 114 supported on a screw 115 which passes through suitable orifices in the removal cover 14 and free end of the arm 113. An adjustable nut 116 having threaded engagement with the screw places the spring under the proper compression.

The ratchet clutch teeth 99 and 101 of the clutch mechanism C are now in mesh and the operator having secured the foil plates and dielectric to the winding mandrel secured to the winding spindle 2 the rotation of the winding spindle 2 is brought about by the operator stepping on the starting pedal (not shown) and through the medium of clutch mechanism CM, operated by the starting pedal, power is transmitted from the power supply PS to the sprocket wheel of the clutch mechanism C associated with the spindle shaft, through the medium of the sprockets and chain drives associated with the power supply and clutch CM. The rotation of the collar 100 secured to the sleeve 93 fastened to the spindle shaft 2 brings about the rotation of the spindle shaft 2, causing rotation of the worm gear 9 which is loosely supported on the hollow shaft 10. As the wing members 19 and 20 of the split portion of cup member 15 are in expanded position they grip the face of the counterbore 26 in the worm gear 9 and the cup member 15 rotates with the worm gear 9. The cup member 15 being secured to the hollow shaft 10, the hollow shaft 10 is also rotated and as the disk 29 is connected to the hollow shaft 10, by means of the pins 30 in the said disk 29 and the orifices 31 in the flange 28 of the hollow shaft 10, the said disk 29 is rotated in the direction of the arrow with reference to Fig. 3. The stop arm 33 integral with disk 32 supported on the sleeve extension of the disk 29 normally engages the stop pin 35' secured to the disk 29 as before described. As the disk 29 connected to the hollow shaft 10 rotates, the disk 32 supported on the sleeve extension of the same also rotates therewith, and the disk 29 and its associated parts continue to rotate with the nose 102 of the detent 82 engaging the peripheral edge of the disk 29. A latch plate 120 secured to the forward end of the detent 82 by suitable screws 121 is provided with a nose 122 which over-hangs the peripheral edge of the disk 29 and co-operates with the arm 33 integral with disk 32 supported on the sleeve extension of the disk 29, and is operatively associated with the notch 104 in the disk 29.

The notch 104 in the peripheral edge of the disk 29 is located along its peripheral edge relative to the zero or indication mark 103 thereon, depending upon the number of turns to be placed on the winding mandrel before the terminals of the respective plates of the condenser are inserted, and for the purpose of illustration and description the notch 104 in the disk 29 is spaced relative to the indication mark 103 to permit fifty turns to be placed on the winding mandrel. But it is to be understood any predetermined number of turns may be wound on the mandrel. The arm 33 integral with the disk 32 rests against the face of the disk 29 with its arcuate end 33' covering the notch 104 in the disk 29. Now as the disk 29 continues to rotate, the arm 33 which covers the notch 104 in the disk 29 is engaged by the nose 122 of the latch plate 120, secured to the detent 82, and as the disk 32 with which the arm 33 is integral is loosely supported on the sleeve extension of the disk 29 this engagement of the latch plate 120 with arm 33 arrests rotation of the arm 33 but the disk 29 continues to rotate.

The arcuate end 33' of the arm 33 is no longer covering the notch 104 in the peripheral edge of the disk 29 and the nose 102 of the detent 82 which is now in position over the notch 104 and ready to drop in, as clearly illustrated in Fig. 8 by means now to be described. The arm 113 secured to the pivoted rod 109 when moved into position as previously described places the spring 114 associated therewith under compression and the instant that the nose 102 of the detent 82 is positioned above the notch 104 in the peripheral edge of the disk 29 the spring 114 associated with the arm 113 moves the same inward with reference to Fig. 7 and rotates the rod 109 to which the arm 113 is secured. The arm 110 secured to the rod 109 is moved to the right, with reference to Fig. 7 and the link 111 which connects the arm 110 with the depending arm 112 secured to the stub shaft 84 causes the arm 112 to be moved to the left with reference to Fig. 3. The movement of the arm 112 causes the stub shaft 84 to rotate and as the clutch arm 90 is secured to the shaft 84 it is moved to the right with reference to Fig. 3. This movement of the clutch arm 90 forces the collar 92 of the clutch mechanism C along the sleeve 93 secured to the winding spindle 2 against the normal tension of the leaf spring 96 to permit the ratchet teeth 99 in the sleeve extension 92' of the collar 92 to disengage the ratchet teeth 101 of the collar 100. The movement of the stub shaft 84 causes the arm 85 secured to the same to move in a downward direction with reference to Fig. 3 and this movement of the arm 85 is transmitted to the detent 82 by the link 86 which connects the arm 85 and detent 82 to force the nose 102 of the same into the notch 104 in the peripheral edge of the disk 29. The disconnection of the ratchet teeth of the collar 92 and the ratchet teeth 101 arrests further rotation of the winding spindle and this permits the operator to insert the terminals of the respective plates of the condenser. To again bring about the rotation of the winding spindle 2 the operator depresses a lever 130 which is pivoted intermediate of its ends to the housing H by the pivot screw 131, to engage a plate 132 slidably supported in a channel 133 cut in the front inside face of the housing H and held in position by a cover plate 134 fastened to the inside face of the housing H. The end 135 of the lever 130 engages the end of the plate 132 when the same is depressed to move the slidable plate 132 upward. A pin 136 secured to the plate 132 and protruding through an elongated slot 137 in the front face of the housing H engages the arm 85 secured to the stub shaft 84 and as the plate 132 moves upward the free end of the arm 85 is also moved and through the medium of the link connection 86 the detent 82 is also raised. The movement of the detent 82 causes the nose 122 of the latch plate 120, secured to the detent 82, to disengage the arm 33 and also raise the nose 102 of the detent 82 clear of the notch 104 in which the same is resting. The rotation of the stub shaft 84 causes the clutch arm 90 secured thereto to move to the left with reference to Fig. 3 causing the bifurcated end 91 to disengage the collar 92 permitting the leaf spring 96 associated with the clutch mechanism C to again force the collar 92 to the left, placing its ratchet teeth 99 in mesh with the ratchet teeth 101 of the collar 100 associated with the winding spindle 2. The arm 113 secured to the pivoted rod 109 is again moved as before described to place the spring 114 associated therewith under compression.

The arm 33 integral with the disk 32 was held due to its engagement with the nose 122 of the latch plate 120 as before described to place helical spring 34 associated therewith under additional tension and the instant that the latch plate 120 disengages the arm 33, due to the movement of the detent 82, the arm 33 is moved clockwise under the tension of the spring 34 until the stop arm 33ª, integral with the disk 32, engages the stop pin 35' secured to the disk 29. The operator now releases the lever 130 and the same is restored by a coil spring and this permits the sliding plate 132 to restore. The arcuate end 33' of the arm 33 again covers the notch 104 in the peripheral edge of the disk 29, and when the lever 130 is released, the arm 85 and detent 82 are moved down under the influence of the spring 114. The nose 122 of the latch plate 120 now rests on the arcuate end 33' of the arm 33 and maintains the nose 102 of the detent 82 clear of the notch 104 in the disk 29. The machine is again set to permit the rotation of the winding spindle 2 and the operator now steps on the starting pedal and power is transmitted to the winding spindle 2 as before described bringing about the rotation of the hollow shaft 10 and disk 29 connected thereto. As the disk rotates the nose 122 of the latch plate 120 secured to detent 82 rides on the arcuate edge 33' of the arm 33 which again covers the slot 104 and when the arm 33 has moved beyond the nose 122 of the latch plate 120 the detent 82 is moved down under the influence of the spring 114 as is readily apparent from the previous description to permit its nose 102 to again ride along the peripheral edge of the disk 29. The disk 29 continues to rotate until the edge of the nose 102 of the detent 82 passes the edge of the notch 140 in the peripheral edge of the disk 29 at which time the detent 82 drops into the notch 140 under the influence of the spring 114 associated with the arm 113 as before described causing the clutch arm 90 to be moved as previously described to bring about the disengagement of the clutch ratchet teeth 99 and 101 and arrest further rotation of the winding spindle 2. The condenser supported on the winding mandrel having received the required number of turns, the operator finishes the same before removal. The operator next depresses the lever 130 which causes the clutch arm 90 to be moved as before described to permit the collar 92 to be moved under the influence of the spring 96 to cause the ratchet teeth 99 of the collar 92 to mesh with the ratchet teeth 101 of the collar 100 secured to the spindle shaft 2. The spindle shaft 2 again rotates and continues as long as the lever 130 remains depressed. After the protecting covering has been placed upon the winding the operator releases the lever 130 permitting the teeth 99 of the collar 92 to disengage the ratchet teeth 101 of the collar 100 and further rotation of the spindle 2 is stopped as is readily understood from the previous description. While I have described the winding machine operating in connection with a particular disk 29 it is to be understood that condensers of vary capacity may be wound, this, of course, depending on the design of the disk, that is, the location of the respective notches 104 and 140 in the peripheral edge of the disk 29.

The finished condenser may now be removed from the winding mandrel and the machine reset to start another winding operation and the means employed for resetting the machine will now be described. To reset the machine the operator applies pressure on the knob 142 rotatably secured to the trigger rod 62 to force the trigger rod 62 in with reference to Fig. 7. As the trigger rod 62 is forced in the pin 63 secured thereto engages the plate 70 supported on the legs 66 and 67 of the forked member 59 and forces the member 59 down with reference to Fig. 7. The member 59 is connected with the plate 45 pivotally supported in the cup member 15 and this movement of the member 59 caused by the movement of the trigger rod 62, causes the plate 45 to change its angular position in which it normally rests by virtue of the tension of spring 68 as previously described. The movement of the plate 45 from its angular position to a horizontal position with reference to Fig. 7 causes the spring 68, supported on the screw member 57 which is connected to the plate 45, to be placed under compression. As the trigger rod 62 moves inward with reference to Fig. 7 its rear end will engage the free end of the arm 113 secured to pivoted rod 109 to cause the rod 109 to rotate. The rotation of the rod 109 causes the arm 110 secured thereto to move to the left to move the link connection 111 in the same direction. This movement of the link connection 111 causes the arm 112 to which the other end of the link 111 is secured to be moved to the right with reference to Fig. 3 to rotate the stub shaft 84. This movement of the stub shaft 84 raises the arm 85 and due to the link connection 86 between the arm 85 and detent 82 the detent 82 is also raised. The nose 102 of the detent 82 is moved out of the notch 140 in the peripheral edge of the disk 29 and permits the restoration of the hollow shaft 10 and its supported parts.

Referring back to the point where the trigger rod 62 was moved it will be remembered that the pivoted plate 45 in the cup member 15 was tilted from its normal angular position to a horizontal position with reference to Fig. 7. When the plate 45 assumes this position the actuating head 46' of the integral extension 46 of the plate 45 which extends into the slot 17 of the cup member 15 is positioned to place its flat faces 50 and 51 parallel with the faces 74 and 75 of the slot 17 in the cup member 15. As before described, the wings 19 and 20 of the split portion of the cup member 15 expanded due to the angular position of the actuating head 46' relative to the faces 74 and 75 of the slot 17 and as the faces 50 and 51 of the actuating head 46' assume a position parallel with the faces 74 and 75 in the slot 17, the wings 19 and 20 move from their expanded to a collapsed position under the influence of the tension under which they were placed when expanded. The wings 19 and 20 release their grip from the circumferential face of the counterbore 26 of the worm gear 9 and as the spring 78 was placed under tension as the cup member 15 rotated the spring 78 now returns the cup member 15 and shaft 10 to which it is secured, and disks 29 and 32 and indicator 42 to their normal position with the tongue extension 15' of the cup member 15 engaging the stop 79. The operator now releases the pressure which was applied to the trigger rod 62 to permit the same to assume its normal position. The spring 68 supported on the screw 57 was placed under tension when the plate 45 was moved to a horizontal position and as soon as the pressure is released from the trigger rod 62 the plate 45 is moved to its angular position under the influence of the spring 68. The pin 63 secured to the trigger rod 62 engages the plate 70 supported on the legs 66 and 67 of the member 59, and the movement of plate 45 to its normal angular position causes the member 59 to be moved forward with reference to Fig. 7 to move the trigger rod 62 forward to its normal position. The plate 45 assuming its angular position again places the faces 50 and 51 of its operating head 46' in an angular position relative to the faces 74 and 75 of the slot 17 in the cup member 15 causing the edges 76 and 77 of the operating heads 46' to again engage the faces 74 and 75 of the slot 17. This engagement of the edges 76 and 77 of the operating head 46' with the faces 74 and 75 of the slot 17 causes the wings 19 and 20 of the cup member 15 to again expand and grip the counterbore 26 in the gear 9. The trigger rod 62 having been restored, the arm 113 secured to the pivoted rod 109 moves up with reference to Fig. 7 under the influence of the spring 114 to cause the arm 85 and detent 82 to move down with reference to Fig. 3, to again allow the nose 122 of the detent 82 to engage the circumferential edge of the disk 29, as is readily apparent from the previous description. The clutch arm 90 was also moved to permit the ratchet teeth 99 of the collar 92 to mesh with the ratchet teeth 101 of the collar 100 under the influence of the spring 96. The machine has now been restored to normal and is now ready to wind another condenser, and to rotate the winding spindle 2 and its associated parts the operator again steps on the starting pedal and the machine operates in the manner just described.

Having described in detail the apparatus and operation of the power winding machine I will now describe the method of supporting the rolls of tin foil which form the plates of a condenser and the rolls of paper which form the dielectric, and the tension devices associated with the supporting means for maintaining the proper tension on the sheets delivered from the rolls to the winding mandrel of the power winding machine just described.

Referring now particularly to Figs. 1 and 2 I illustrate the complete condenser winding machine of my invention and it comprises a suitable pedestal P which supports a bed plate or table BP upon which is secured the power winding machine PW already described in detail. A plate 160 secured to the pedestal P intermediate of its ends supports a suitable power source PS which comprises a motor and a suitable speed reducing mechanism. A suitable clutch mechanism CM is secured to bottom of the bed plate BP and is controlled by a pedal (not shown). Through the medium of a suitable chain drive and sprockets, associated with the power source PS and clutch mechanism CM, power is supplied to the clutch mechanism CM. A suitable chain connects the sprocket 161 of the clutch mechanism CM to the sprocket 7 connected with the winding spindle 2 of the winding machine PW and power is transmitted to the winding spindle 2 when the clutch CM is actuated by the operator of the machine through the medium of the starting pedal. A housing HO is also supported on the bedplate BP, and secured thereto and positioned behind the power winding machine PW and secured to the outside face of the housing wall 162 is a plurality of combined paper supporting spindles for supporting the rolls of tin foil and tissue paper and tension devices T. As all the devices are similar in construction a detailed description of one will suffice.

The combined paper supporting spindle and tension device T, illustrated in detail in Figs. 10 to 13 inclusive comprises a spindle supporting housing 163 provided with substantially circular end pieces 164 and 165 which are provided with counterbores 166 and 167 adapted to receive the ball race retainers 168 and 169; and ball bearings 170 and 171 which rest in these retainers 168 and 169 and to rotatably support a paper supporting spindle 172 in the housing 163. The retainers 168 and 169 which fit in the counterbores 166 and 167 in the respective ends 164 and 165 of the housing 163 are provided with reduced portions 173 and 174 which protrude through orifices in the ends 164 and 165 of the housing 163 and support ball bearings 175 and 176 which in turn rest in counterbores 177 and 178 in the respective ends 179 and 180 of a tension arm 181. The ball bearings 175 and 176 supported on the reduced portions 173 and 174 of the retainers 168 and 169 rotatably support the tension arm 181 which is for purposes as will presently be described. A collar 182 having a threaded sleeve extension 183 engages a threaded orifice in the tension arm 181 to engage a plate 185 which rests against the ball bearing 176 in the counterbore 178 of the tension arm 181 and serves to adjust the tension arm 181 supported on the reduced portions 173 and 174 of the retainers 163 and 169 to prevent lateral movement of the same. An adjustable plate 186 having threaded engagement with the threaded end 187 of the spindle 172 serves to adjust the same to prevent lateral movement of the spindle 172 in its respective bearings 170 and 171 and a lock nut 189 having threaded engagement with the end of the shaft 187 locks the plate 186 in adjusted position.

The housing 163 is provided with an integrally formed flange 192 and screws 193 passing through orifices in the flange 192 have threaded engagement with tapped orifices in the wall 162 of the housing HO to secure the housing 163 and the tension arm 181 supported therein to the wall of the housing HO. The substantially circular end 164 of the housing 163 extends into an orifice 194 in the wall of the housing HO and the spindle 172 supported in the housing 163 protrudes into the housing HO to which the devices T are secured. The protruding end 172' of the shaft supports a collar 195 which in turn supports a sleeve 196 which slips over the collar 195, the said collar 195 and sleeve 196 supported thereon being in turn secured to the shaft end 172' as a whole by means of a pin 197 which passes through orifices in the collar 195 and sleeve 196 and spindle end 172' respectively. The sleeve 196 secured to the spindle end 172 is adapted to receive a supply roll of tin foil or tissue paper for delivery to the winding machine mandrel, of the winding machine PW, and I provide novel means associated with the sleeve 196 for securing the roll of supply material thereon against displacement and which I will now describe. A plug or disk 198 of a size to permit the same to fit in the sleeve 196 is secured therein intermediate of its ends and a plug 199 fitting in the sleeve 196 at its outer end and secured therein serves to support an adjustable shank 200. The sleeve 196 is provided with a pair of slots 201 diametrically opposite each other to permit the insertion of a pair of bowed leaf springs 202, the ends of which engage respectively the plug 199 and the end of the collar 195 secured to the spindle end 172'. The disk 198 which is secured in the sleeve 196 as before described, is located therein to position it substantially intermediate of the ends of the diametrically opposite slots 201, and is provided with a pair of diametrically opposite orifices 203 which are aligned with the slots 201 in the sleeve 196, and pins 204 secured to the leaf springs 202 extend into these orifices 203. The plug 199 secured in the sleeve 196 is provided with a threaded orifice 205 which is adapted to receive the threaded portion 200' of a shank 200 and an orifice 206 in the disk 198 is adapted to receive the end of the shank 200. The ends of the pins 204 which are secured to the leaf spring 203 are rounded and extend into the orifice 206 in the disk 198 and are adapted to be engaged by the tapered portion 207 of the shank 200. The bowed portions of the springs 202 extend into the slots 201 of the sleeve 196, as illustrated in Fig. 11, and are shown in the normal or unflexed position with the pins 204 secured thereto and which extend through the orifices 203 in the disk 198 engaging the reduced end 208 of the shank 200. The shank 200 is provided with a square head 209 for the application of a suitable wrench by which the shank 200 may be turned. To secure a roll of material on the sleeve 196, the same is slipped thereon until it abuts against a disk 210 secured to an integrally formed flange of the collar 195, which aligns the roll of material with the square opening in the front wall 211 of the housing HO. To now secure this roll of material to the sleeve 196 the shank 200 is turned by means of a suitable socket wrench engaging the head 209 in a direction to cause the tapered portion 207 of the shank 200 to engage the rounded ends of the pins 204 secured to the leaf springs 202. The tapered portion 207 of the shank 200 forces the pins 204 up to cause the bowed portions of the leaf springs 202 to be flexed. This flexure of the leaf springs 202 causes them to move up through the slots 201 in the sleeve 196 and grip the roll of material supported thereon to prevent the roll of material from moving laterally on the sleeve 196 or to rotate on the same independent of the rotation of the spindle 172 to which the sleeve 196 is secured.

The free end of the tension arm 181 is provided with an orifice 310 adapted to receive a stud 311 which is secured to the arm by means of a nut 212 having threaded engagement with the end of the stud 311. The stud 311 extends through an arcuate slot 213 in the wall 162 of the housing HO and an orifice 214 in the protruding end of the stud 311 is adapted to receive a supporting rod 215 which is secured to the stud 311 by means of a drive fit. A pair of ball bearings 216 and 217 supported on the rod 215 rotatably support a sleeve or hollow roller 218 and an adjustable plate 219 having threaded engagement with the end of the rod 215 positions the sleeve or roller 218 against lateral movement, and a lock nut 220 having threaded engagement with the threaded end of the rod maintains the sleeve roller 218 in its adjusted position. The paper or tin foil supported on the spindle sleeve 196 passes over this roller 218 and is for purposes as will presently be described.

A suitable brake mechanism B is associated with the tension arm 181 and comprises a pair of brake arms 221 and 222 provided with intermediate substantially semi-circular shaped portions 221' and 222' which are lined with suitable strips of leather 223. The respective ends 224 and 225 of the brake arms 221 and 222 extend through suitable orifices 227 in the housing 163 and are pivotally secured to a bracket 226 by pivot pins 228, the said bracket 226 being in turn secured to the housing by suitable screws.

A brake drum 230 secured to the shaft 172 is adapted to cooperate with the semi-circular leather lined portions 221' and 222' of the pivoted arms 221 and 222 and I provide adjustable spring means associated with the free end 231 and 232 of the brake arms 221 and 222 to regulate the pressure applied to the brake drum 230 by the brake arms 221 and 222. The spring means comprises a threaded pin 233 which extends through aligned orifices in the free ends 231 and 232 of the arms 221 and 222 and a helical spring 234 supported on the protruding end of the pin 233 may be compressed by an adjustable nut 235 which has threaded engagement with the pin 233. A plate 236 secured to the wall 162 of the housing HO by screws 236' has secured to it a stud 237 which rotatably supports a cam member 240 to which is secured an arm 238. The cam member 240 rotatably supported on the stud 237 rests between the free ends 231 and 232 of the brake arms 221 and 222 and is provided with cam faces 241 and 241' which when positioned between the arms 221 and 222 lie substantially parallel with the inside faces of the respective arms. The cam member 240 is provided with a sleeve extension 240' and the arm 238 secured to the cam 240 is provided with an orifice of a size to fit on the sleeve extension 240' of the cam 240 and a depending split portion integral with the arm 238 permits the same to be clamped on the sleeve extension of the cam 240 against movement by suitable means such as a screw. The tension arm 181 is connected to the arm 238 secured to the stud 237 by means of an adjustable link comprising a member 242 pinned to the tension arm 181 and a pitman 243 one end of which is shaped to form a ball and socket joint with the free end 245 of the arm 238 and the other end being threaded and having threaded engagement with a tapped orifice in the member 242 pinned to the tension arm 181. A thumb piece 246 secured to pitman 243 is for the purpose of rotating the pitman 243 to adjust the cam member 240 secured to the stud 237 relative to the arms 221 and 222 of the brake B. An arm 247 pivotally secured to the tension arm 181 extends through an orifice 248 in the housing 163 and supports a spring 249 and an adjustable nut 250 having threaded engagement with the threaded end of the arm 247 adjusts the tension of the spring 249 to serve as a counter balance for the tension arm 181 and also serves to restore the tension arm 181 to normal.

The combined paper supporting spindles and tension devices T are secured to the wall 162 of the housing HO as before described and as clearly illustrated in Fig. 1. The rollers 218 secured to the tension arms 181 and the paper supporting spindle sleeves 196 extend respectively through arcuate slots 213 and orifices 194 in the wall 162 of the housing HO into the interior of the housing. For the purpose of illustration I have shown six devices T secured to the wall of the housing HO which provide spindles for supporting two rolls of tin foil and four rolls of suitable dielectric such as tissue paper. It is to be understood that any number of tension devices may be provided depending upon the number of layers of paper and foil to be used in the condenser. The respective ribbons of material are fed over the respective rollers 218, supported on the tension arms 181, and through the square opening in the wall of the housing HO. The ribbons of material are then fed over rollers 270 supported on an adjustable rack 271, secured to the front wall 211 of the housing HO, to the winding mandrel supported by the spindle shaft 2 of the winding machine PW. The operator now steps on the starting pedal to transmit power from the clutch mechanism CM to the winding spindle 2, and when the spindle 2 rotates a tension or pull is placed upon the individual ribbons of material as they are fed to the winding mandrel. The winding spindle 2 when rotated exerts a pull on the ribbon of material and this pull moves the tension arm 181 to the right with reference to Figs. 10 and 12, and the arm 238 being linked to the tension arm 181 by means of the adjustable pitman 243 and member 242 the said arm 238 is also moved to the right. The movement of the arm 238 causes the cam 240 to rotate about the supporting stud 237 to place the respective edges 260 and 261 in engagement with the respective inner faces of the brake arms 221 and 222. This spreads the free ends 231 and 232 of the arms 221 and 222 against the normal compression of the helical spring 234 and this movement of the free ends 231 and 232 of the brake arms 221 and 222 releases the pressure applied on the brake drum 230 by the arcuate shaped leather lined portions 221' and 222' due to the normal compression of the spring 234 associated with brake arms 221 and 222. The spindle 172 now rotates freely, and the arm 238 and the cam 240 in association with the brake arms 221 and 222, springs 234 and 249, and brake drum 230, maintains a proper tension upon the ribbon of material as it passes over the roller 218 of the tension arm 181 to the winding spindle 2 of the winding machine PW. Any excess pull on the ribbon of material will cause the tension arm 181 to act instantaneously and cause arm 238 to move through the link connection means to cause the cam 240 to act to affect the brake arms 221 and 222 to further release the pressure on the brake drum 230 instantaneously. As the tension arm 181 is moved spring 249 supported on the arm 247 is also compressed.

When the winding spindle 2 of the winding machine PW is automatically stopped for the purpose of inserting the terminals of the respective plates or when the required number of turns have been placed on the winding mandrel as before described the pull on the ribbon of material ceases. The instant that the pull ceases the spring 249 which was placed under compression by the movement of the tension arm 181 restores the arm 181 to normal and due to the link connection between the tension arm 181 and the arm 238 secured to the cam member 240 the said member 240 is also affected causing the cam edges 260 and 261 to move away from the inner faces of the brake arms 221 and 222. The spring 234 supported on the pin 233 was compressed when the arms 221 and 222 were moved as before described and the instant that cam edges 260 and 261 disengage the arms 221 and 222 the spring 234 again presses the arcuate leather lined portions 221' and 222' into engagement with the brake drum 230 to instantly stop the rotation of the spindle 172 which has secured to it the sleeve 196 and which supports the roll of supply material. It is thus readily apparent that the instant the winding spindle 2 stops rotating the pull on the ribbon of material which is led over the roller 218 on the tension arm 181 is arrested, the spring 249 which was compressed when the tension arm 181 was moved to the right restores the arm 181 to its normal portion. This return movement of the arm 181 also affects the arm 238 as before described to permit the brake arms 221 and 222 to act instantaneously and check the rotation of the roll of material supported on the sleeve 196. The instantaneous stopping of the spindle 172 prevents any over run of the roll of material supported on the sleeve 196 and the spring 249 is so adjusted that it maintains the arm in a position so as to take up any slack which may be in the ribbon of material after the winding machine PW is automatically stopped.

Varying thicknesses or gauges of material are used in the manufacture of condensers so I have provided means whereby the arc of movement of the tension arm 181 may be regulated to affect the movement of the cam 240 to operate the brake mechanism B. When the link connection between the arm 238 and the tension arm 181 is lengthened through the medium of the adjustable pitman 243 of the link, the arm 238 secured to the sleeve extension of the cam 240 is moved to the left with reference to Fig. 10, and this movement of the arm 238 also affects movement of the cam 240 to place the respective cam faces 241 and 241' substantially parallel with the inner faces of the free ends of the brake arms 221 and 222. When the ribbon of material which passes over the roller 218 is subjected to a pull as before described it causes the tension arm 181 to move to the right with reference to Fig. 10, and with the link connection between the arm 238 and the tension arm 181 lengthened as just described a certain amount of movement of the tension arm 181 to the right is permitted before the cam 240 effects the movement of the brake arms 221 and 222. When the cam faces 241 and 241' are positioned substantially parallel to the inner faces of the arms 221 and 222 a predetermined amount of movement of the tension arm 181 and the arm 238 is permitted before the cam edges 260 and 261 engage the inner faces of the arms 221 and 222 to force them apart against the normal tension of the spring 234 to release the brake drum 230 to permit the free rotation of the spindle 172. The springs 234 and 249 may also be adjusted by means of the respective adjusting nuts 235 and 250 to place the springs under greater tension so that a considerable amount of pull by the ribbon of material passing over the roller 218 must be applied to overcome the tension of the springs 234 and 249 to allow the arm 181 to move and cause the arm 238 which is linked thereto to actuate the cam 240 to force the brake arms 221 and 222 apart. This adjustment of the tension arm 181 may be used where the material used is of a heavy gauge to maintain the tension arm 181 under proper tension to keep the ribbons of material which pass over the rollers 218 of the respective tension arms 181 taut between the said rollers 218 and the winding mandrel during the winding operation of the condenser.

When the link connection between the arm 238 and tension arm 181 is shortened the arm 238 is moved to the right with reference to Fig. 10 causing the cam 240 to which the arm 238 is secured to be rotated about its supporting stud 237 to place the faces 241 and 241' in an angular position relative to the inner faces of the brake arms 221 and 222 and move the cam edges 260 and 261 into engagement with the respective faces of the arms 221 and 222. Now when a pull is applied to the ribbon of material which passes over the roller 218; the movement of the tension arm 181 to the right causes the arm 238 to be moved to the right to rotate the cam 240. The cam edges 260 and 261 are so positioned relative to the faces of the brake arms 221 and 222 that only a slight rotation of the cam 240 will cause the arms 221 and 222 to be forced apart to release the brake drum 230 to permit the free rotation of the spindle 172. The tension of the springs 234 and 249 may also be decreased by means of the adjusting nuts 235 and 250 so that only a slight amount of pull on the tension arm 181 is required to overcome the tension of the springs 234 and 249 to allow the arm 181 to move and cause the arm 238 which is linked thereto to actuate the cam 240 to force the brake arms 221 and 222 apart. This adjustment of the tension arm 181 may be used when the material used is of a light gauge to maintain the tension arm under proper tension to keep the ribbons of material which pass over the rollers 218 of the respective tension arms 181 under proper tension.

While I have illustrated and described one particular embodiment of my invention it is to be understood that changes and modifications will suggest themselves to those skilled in the art and I therefore aim to cover all such changes and modifications as come within the spirit and scope of the appended claims.

What I claim as new and desire to secure by United States Letters Patent is:

1. A winding machine of the character described including means for automatically winding simultaneously turns of different materials upon a winding spindle, and means including a disk having spaced notches in its peripheral edge, a detent associated with said disk, an arm loosely supported by said disk normally covering the first of said notches and a device on said detent for holding said arm to permit said detent to enter said notch for automatically stopping the rotation of said winding spindle at predetermined points in the winding during the time said winding spindle is making said predetermined number of revolutions.

2. A winding machine of the character described including means for automatically winding turns of different materials upon a winding spindle simultaneously, a disc having a pair of notches in its peripheral edge, a detent associated with said disc, an arm loosely supported by said disc and normally covering one of said notches, a latch on said detent for holding said arm to permit said detent to enter said notch to automatically stop the rotation of said winding spindle at intervals while said winding spindle is making said predetermined number of revolutions, and resetting means to permit the rotation of said winding spindle after each stop.

3. In a winding machine, the combination with a winding spindle, driving means, clutch mechanism associated with said winding spindle for connecting and disconnecting said winding spindle to and from said driving means, setting means adapted to be driven by said winding spindle comprising a disk having a pair of notches in its peripheral edge and an arm covering one of said notches, a detent having a latch for holding said arm to clear said notch to permit said detent to enter said notch in said disk after a predetermined extent of movement of said setting means to operate said clutch mechanism to render said driving means inoperative, and means operative to reset said setting means to continue another predetermined movement of said setting means.

4. In a winding machine, the combination with a winding spindle, driving means, clutch mechanism associated with said winding spindle for connecting and disconnecting said winding spindle to and from said driving means, setting means adapted to be driven by said winding spindle, comprising a disc having a pair of notches, an arm loosely supported on said disc and normally covering one of said notches, a detent associated with said disc, said detent carrying a latch adapted to hold said arm to clear said notch to permit said detent to enter said notch in said disk after a predetermined extent of movement of said setting means to operate said clutch mechanism to render said driving means inoperative, and means operative to reset said detent to permit another predetermined movement of said setting means and the rotation of said winding spindle.

5. In a winding machine, the combination with a winding spindle, driving means for said winding spindle, a clutch associated with said winding spindle for connecting and disconnecting said winding spindle to and from said driving means, setting means adapted to be driven by said winding spindle, comprising a disk provided with a plurality of notches, an arm loosely supported on said disk and normally covering one of said notches, a detent associated with said disk, said detent carrying a latch adapted to hold said arm to clear said notch to permit said detent to enter one of said notches in said disk after a predetermined extent of movement of said setting means to operate said clutch mechanism to render said driving means inoperative, and means operative to reset said detent to permit another predetermined movement of said setting means and the rotation of said spindle.

6. In a winding machine, the combination with a winding spindle, driving means for said winding spindle, clutch mechanism associated with said winding spindle for connecting and disconnecting said winding spindle to and from said driving means, setting means adapted to be driven by said winding spindle, comprising a disk provided with a plurality of notches, an arm loosely supported on said disk and normally covering one of said notches, a detent associated with said disk, said detent carrying a latch adapted to hold said arm to clear said notch to permit said detent to enter one of said notches in said disk after a predetermined extent of movement of said setting means to operate said clutch mechanism to render said driving means inoperative, and means operative to reset said detent to permit another predetermined movement of said setting means.

7. In a winding machine, the combination with a winding spindle, driving means for said winding spindle, a clutch associated with said winding spindle for connecting and disconnecting said winding spindle to and from said driving means, setting means driven by said winding spindle and adapted to permit a predetermined number of revolutions of said winding spindle comprising a disk provided with notches spaced at a predetermined distance in the peripheral edge of said disk, an arm loosely supported on said disk and normally covering the first of said notches, a detent associated with said disk, said detent carrying a latch adapted to hold said arm to clear said notch to permit said detent to enter the first of said notches after a predetermined extent of travel of said disk to operate said clutch to render said driving means inoperative, and means operative to reset said detent to permit another predetermined travel of said disk before said detent engages the other of said notches.

8. In a winding machine, the combination with a winding spindle, driving means for said winding spindle, a clutch associated with said winding spindle for connecting and disconnecting said winding spindle to and from said driving means, setting means driven by said winding spindle and adapted to permit a predetermined number of revolutions of said winding spindle comprising a disk provided with notches spaced at predetermined distances in the peripheral edge of said disk, a detent associated with said disk, an arm loosely supported on said disk normally covering the first of said notches, a latch plate on said detent adapted to engage said arm after a predetermined extent of travel of said disk to clear said notch to permit said detent to drop into said first notch to operate said detent to actuate said clutch to render said driving means inoperative, and means operative to actuate said detent to permit said latch to disengage said arm and said detent to disengage said notch to permit the arm to again cover said first notch to permit another predetermined travel of said disk before said detent drops into said other notch at which instant said winding spindle has made said predetermined number of revolutions.

9. An automatic winding machine for simultaneously placing layers of materials upon a winding spindle, and automatic means comprising a disk having notches in its peripheral edge, clutch mechanism, an arm supported on said disk and normally covering one of said notches, a detent associated with said disk, means for engaging said arm to clear said notch to permit said detent to enter said notch to actuate said clutch mechanism for stopping said winding machine when a predetermined number of turns of said materials have been placed upon said winding spindle.

10. An automatic winding machine for simultaneously placing layers of materials upon a winding spindle, automatic means comprising a disk having notches in its peripheral edge, clutch mechanism, an arm supported on said disk and normally covering one of said notches, a detent associated with said disk, means for engaging said arm to clear said notch to permit said detent to enter said notch to actuate said clutch mechanism for stopping the rotation of said winding spindle when a predetermined number of turns of said materials have been placed upon said winding spindle, and means for thereafter continuing the rotation of said winding spindle.

11. An automatic winding machine for placing simultaneously a predetermined number of layers of materials upon a winding spindle, automatic means comprising a disk having notches in its peripheral edge, clutch mechanism, an arm supported on said disk and normally covering one of said notches, a detent associated with said disk, means for engaging said arm to clear said notch to permit said detent to enter said notch to actuate said clutch mechanism for stopping said winding machine when said predetermined number of turns of material have been placed upon said winding spindle, and means for returning said machine to normal.

12. An automatic winding machine for simultaneously placing materials in layers upon a winding spindle, automatic means comprising a disk having notches in its peripheral edge, clutch mechanism, an arm supported on said disk and normally covering one of said notches, a detent associated with said disk, means for engaging said arm to clear said notch to permit said detent to enter said notch to actuate said clutch mechanism for discontinuing the rotation of said winding spindle after it has made a predetermined number of revolutions, and operator controlled means for restoring said automatic machine to normal.

13. An automatic winding machine for simultaneously placing layers of material upon a winding spindle, power means for rotating said spindle, automatically controlled means comprising a disk having notches in its peripheral edge, a detent associated with said disk, an arm loosely supported on said disk and normally covering one of said notches, means on said detent adapted to hold said arm to clear said notch to permit said detent to enter said notch to disconnect the power means from said winding spindle after said winding spindle has made a predetermined number of revolutions, means for permitting a further rotation of said winding spindle after which said automatically controlled means again disconnects said power means from said winding spindle.

In testimony whereof I have signed this specification.

MARTIN B. GROUT.